United States Patent
Peters

(10) Patent No.: US 8,612,471 B2
(45) Date of Patent: Dec. 17, 2013

(54) METHOD AND SYSTEM FOR INVENTORY DATA ENTRY

(75) Inventor: Johan Christiaan Peters, Sankt-Leon Rot (DE)

(73) Assignee: SAP AG, Walldorf (DE)

(*) Notice: Subject to any disclaimer, the term of this patent is extended or adjusted under 35 U.S.C. 154(b) by 1531 days.

(21) Appl. No.: 11/615,510

(22) Filed: Dec. 22, 2006

(65) Prior Publication Data

US 2008/0149712 A1   Jun. 26, 2008

(51) Int. Cl.
*G06F 17/30* (2006.01)

(52) U.S. Cl.
USPC .............................. 707/769; 705/22

(58) Field of Classification Search
USPC ............... 707/769, 821, 912, 949; 705/22; 235/385
See application file for complete search history.

(56) References Cited

U.S. PATENT DOCUMENTS

| | | | |
|---|---|---|---|
| 6,549,891 B1* | 4/2003 | Rauber et al. | 705/28 |
| 7,287,001 B1* | 10/2007 | Falls et al. | 705/22 |
| 2001/0020935 A1* | 9/2001 | Gelbman | 345/173 |
| 2005/0055286 A1* | 3/2005 | Zimet | 705/28 |
| 2005/0140498 A1* | 6/2005 | Bastian | 340/5.92 |
| 2006/0026197 A1* | 2/2006 | Quinn et al. | 707/103 R |
| 2006/0100937 A1* | 5/2006 | Lucas | 705/26 |
| 2006/0287903 A1* | 12/2006 | Heard | 705/8 |
| 2007/0250411 A1* | 10/2007 | Williams | 705/28 |

* cited by examiner

*Primary Examiner* — Greta Robinson
(74) *Attorney, Agent, or Firm* — Kenyon & Kenyon LLP

(57) ABSTRACT

A method and a system for inventory data entry. The method generates identification codes that correspond to labels affixed to items to be logged into inventory and stores information about items associated with the identification codes. The method further allows a user to search for an identification code in the database when the item is ready to be logged in. The system provides a memory and a processor for inventory data entry.

10 Claims, 7 Drawing Sheets

| Identification Code 310 | Item Description 320 | Item Receipt Flag 330 |

| Identification Code | Item Description | Item Receipt Flag |
|---|---|---|
| 000121 | Case of Carbonated Drinks | Y |
| 000122 | 11x11 Box of Children's Books | Y |
| 000123 | --- | --- |

METHOD AND SYSTEM FOR INVENTORY DATA ENTRY

BACKGROUND

Most large businesses use highly automated inventory management systems to log in new inventory. The typical process includes: an inventory operator affixing a unique identification code, e.g., a barcode, to each item that enters the business's warehouse and scanning the affixed identification codes with a portable scanner in communication with an inventory database; the portable scanner transmitting the codes to an inventory computer; and the inventory computer creating a data record in an inventory database that identifies the item according to the affixed identification code. The data record may be updated later with additional item information.

Many small businesses, however, do not have such systems, because either they handle smaller amounts of inventory or they can not afford the more expensive automated systems. In such cases, inventory must be logged in manually. The typical process includes: the inventory operator affixing the unique identification code, e.g., the barcode, to each item that enters the business's warehouse and to that item's shipping form and then entering by hand the identification codes from either the item or the item's shipping form into the inventory computer; and the inventory computer creating a data record in the inventory database that identifies the item according to the hand-entered identification code. A concern with this approach is that it is more susceptible to error such as, for example, the operator entering erroneous identification codes in the database. This approach is also time-consuming and inconvenient for the operator.

Accordingly, there is a need in the art for an effective way for businesses without highly automated inventory management systems to successfully log in new inventory.

BRIEF DESCRIPTION OF THE DRAWINGS

FIG. 3A is a block diagram that depicts an identification code data record in accordance with an embodiment of the present invention.

FIG. 3B is an example of the data record depicted in FIG. 3A.

DETAILED DESCRIPTION

Figure 1:
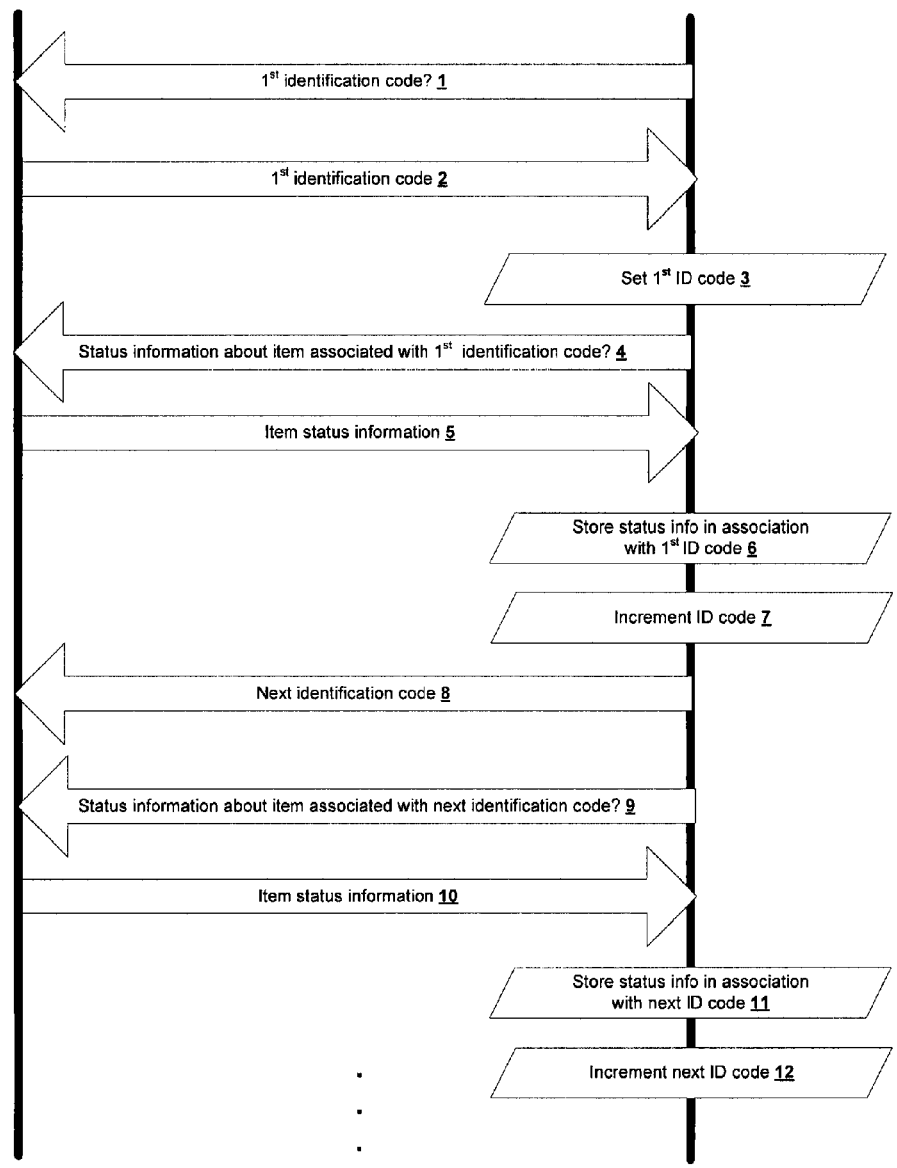
FIG. 1 is a flow diagram that depicts inventory data flow in accordance with an embodiment of the present invention.

Embodiments of the present invention include methods and systems for inventory data entry, where the data includes identification codes for and status information about inventory items. Identification codes may be numbers, characters, symbols, or any combinations thereof that correspond to codes on pre-printed inventory tracking labels to be affixed to inventory items. The identification codes and the labels' codes are typically the same, where each identification code has a corresponding label. The identification codes may be stored in the inventory database in association with status information about the items affixed with the corresponding labels.

In a method according to an embodiment of the present invention, a processor may query an inventory operator for the code on the first pre-printed inventory tracking label of a set of labels to be affixed to inventory items. The processor may further query the operator about the status of the item having the first label affixed thereto. Upon receipt of the first label's code and the item status information from the operator, the processor may store the code in association with the status information in the inventory database. If there are additional items to be affixed with the tracking labels, the processor may propose a new code that is most likely to be pre-printed on the next available tracking label and query the operator about the status of the item having the new code label affixed thereto. Upon receipt of the new code label's item status information, the processor may store the new code in association with the status information in the inventory database. The processor may repeat the proposing, querying, and storing until status information about all the items is stored in the database. The processor may generate each new code just prior to proposing it to the operator. This method may advantageously provide a convenient way for the operator to enter item status information without having to manually enter the code as well.

In another method according to an embodiment of the present invention, a processor may generate all the identification codes at once prior to entering the first item's status information. In this method, the processor may query an inventory operator for the code on the first pre-printed inventory tracking label of a set of labels to be affixed to inventory items. The processor may optionally query the operator for the number of labels. Upon receipt of the first label's code from the operator, the processor may generate a set of identification codes to be the same as the codes on the pre-printed tracking labels, beginning with the first label's code. The processor may then store the identification codes for later association with the items to which the corresponding pre-printed labels are affixed. This method may advantageously allow the operator to enter status information of items in any order, rather than only according to the order of the pre-printed labels.

In another method according to an embodiment of the present invention, after some or all of the identification codes have been generated, a processor may search the inventory database for a particular identification code so that the item affixed with the corresponding tracking label may be associated with the identification code in the database. The processor may query an inventory operator for the code pre-printed on the label affixed to the item for which the operator wants to enter status information into the database. The processor may perform the query by proposing to the operator the first available identification code in the database. The first available code may be the first one in the database that does not have item status information associated therewith. Proposing the first available identification code may be a time-saver for the inventory operator in cases where the operator logs in items according to the order of the pre-printed labels. This way, the operator need not search each time for the identification code. However, if the operator requests an identification code that is not the same as the proposed identification code, the processor may search the database for the requested identification code. The processor may then update the data record with the item's status information. This method may advantageously allow the inventory operator to quickly and easily search through the database for the requested identification code.

A system in accordance with an embodiment of the present invention may include memory and a processor to generate identification codes and to store in the memory the codes and status information about items affixed with pre-printed labels corresponding to the codes.

A graphical user interface in accordance with an embodiment of the present invention may be used by the inventory operator to input codes from pre-printed labels and item status information, to view codes and other information, and to search for codes.

FIG. 1 is a flow diagram that depicts inventory data flow between a user, e.g., an inventory operator, and the inventory computer system, in accordance with an embodiment of the present invention. An application running on an inventory computer 170 may send a query (1) to a user 180 for an identification code. The user 180 may input the code pre-printed on the first one of a set of pre-printed inventory label (2), where the first label is affixed to the first inventory item. The application may set the inputted code as the first identification code (3) in a data record stored in the memory of the computer 170. This data record may be the data record for the first inventory item, since the first identification code is printed on the first label, which is affixed to this item. The application may send a query (4) to the user 180 for status information about the first inventory item. The user 180 may input the status information (5) about the first inventory item. The application may store the status information in association with the first identification code (6) in the memory of the computer 170.

The application may increment the first identification code to get the next identification code (7) in the sequence, where the next identification code may be the same as the code pre-printed on the second pre-printed inventory label. The application may propose the next identification code (8) to the user 180 and send a query (9) to the user 180 for status information about the second inventory item, where the second label is affixed to the second inventory item. The user 180 may input the status information (10) about the second inventory item. The application may store the status information in association with the second identification code (11) in the memory of the computer 170.

The application may increment the second identification code to get the next identification code (12) in the sequence, where the next identification code may be the same as the code pre-printed on the third pre-printed inventory label. The user 180 and the application on the inventory computer 170 may then repeat the above proposing (8), querying (9), inputting (10), storing (11), and incrementing (12) for all the subsequent inventory items having affixed thereto respective subsequent pre-printed inventory labels until status information about all the inventory items has been stored in the memory of the computer 170.

There may be a discontinuity in the identification code sequence, e.g., when a first roll of labels is either used up or discarded after being used on the first inventory items and a second roll of labels has to be used on the remaining items. In this case, after logging in all the inventory items labeled with the first roll, the user 180 may input the code pre-printed on the first label (2) in the second roll and repeat (3)-(12) for the inventory items labeled with the second roll, as described above.

Figure 2:
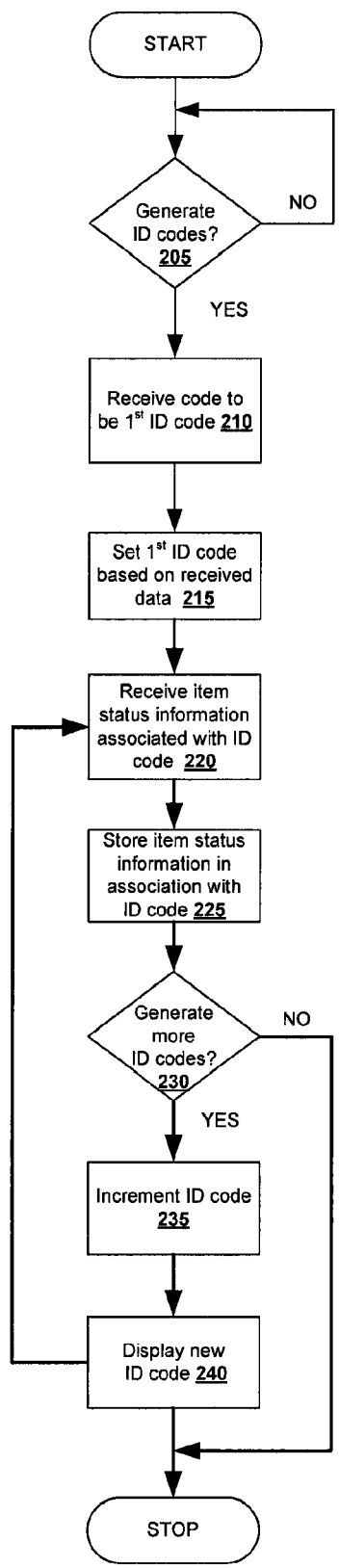
FIG. 2 is a flowchart of an inventory data entry method in accordance with an embodiment of the present invention.

FIG. 2 is a flowchart of an inventory data entry method in accordance with an embodiment of the present invention. A processor may await (205) a request from a user or another processor to generate an identification code. The received request may include (210) the code that is to be the first identification code, where the identification code corresponds to the code printed on a first inventory label. The processor may set (215) the first identification code based on the received code and store the first identification code in a data record in an inventory database. The processor may receive (220) status information about the inventory item having the first label affixed thereto. The processor may store (225) the status information about the item in the data record in the inventory database in association with the first identification code.

The processor may query (230) whether more identification codes are to be generated. If not, the processor may exit the data entry method.

If however there are more identification codes to be generated, the processor may increment (235) the first identification code to get the second identification code in the sequence, where the second identification code corresponds to the code printed on the second inventory label, and then store the second identification code in a second data record in the inventory database. The processor may display (240) the second identification code to the user and then receive (220) status information about the inventory item having the second label affixed thereto. The processor may store (225) the status information about the second item in the second data record in the inventory database in association with the second identification code.

Until all the requested identification codes have been generated and status information about the respective items stored, the processor may repeat querying (230), incrementing (235), displaying (240), receiving (220), and storing (225).

If there is a discontinuity in the identification codes, the processor may await (205) the first identification code after the discontinuity and then repeat the data entry method.

In this embodiment, the next identification code is incremented from the preceding identification code. In an alternate embodiment, the next identification code may be calculated from any deterministic algorithm that is a function of the codes printed on the inventory labels.

A graphical user interface may be used in the inventory data entry method. A user may enter the code printed on the first label into an interactive window in the interface. The data entry application may display the identification codes to the user in the interactive window. The user may enter item status information in association with the displayed identification code in a second interactive window in the interface.

FIG. 3A is a block diagram that depicts an example of an identification code data record according to an embodiment of the present invention. This data record 300 may include fields for an identification code 310, an item description 320, and an item receipt flag 330. The identification code field 310 may include the identification code that corresponds to the code printed on a label affixed to an item. The item may be described in the item description field 320. The item receipt flag field 330 may indicate whether the item has been received into inventory.

FIG. 3B is an example of data records as depicted in FIG. 3A. An inventory database 350 may include a data record for each generated identification code. If an item having a label affixed thereto has been received into inventory, the data record for the corresponding identification code may be filled out, as in the first and second data records in the database 350. The next data record may include the next identification code in preparation of receipt of the corresponding item status information.

It is to be understood that the data records in FIGS. 3A and 3B are examples. Data records may include any information about and/or structure for the identification code, the corresponding label, and the label-affixed item according to embodiments of the present invention.

Figure 4:
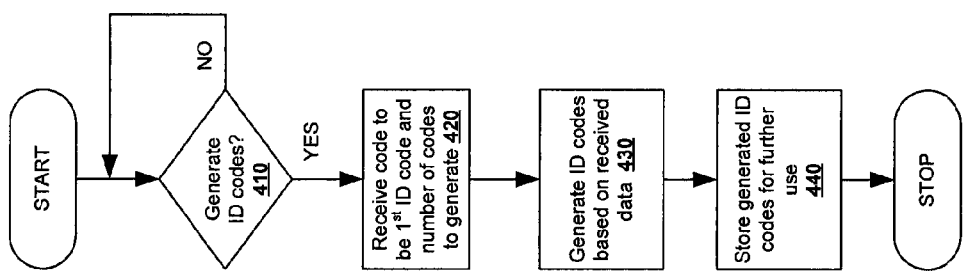
FIG. 4 is a flowchart of an identification code generation method in accordance with an embodiment of the present invention.

FIG. 4 is flowchart of an alternate method to generate identification codes according to an embodiment of the present invention. In this method, a processor may generate all the identification codes at once prior to entering any item status information. The processor may await (410) a request from a user or another processor to generate identification codes. The received request may include (420) the code that is to be the first identification code and/or the total number of identification codes to be generated. The first identification code may be the same as the code printed on the first one of a set of printed labels. The total number of identification codes to be generated may be the same as the total number of printed labels that are to be used, that make up the set, etc. If the request does not include the first code, the processor may set the first code to a predetermined default value. Similarly, if the request does not include the total number of identification codes to be generated, the processor may set the total number to a predetermined default value.

Upon receipt of the request, the processor may then generate (430) the identification codes based on the first code and/or the total number of codes.

As mentioned previously, to generate the codes, the processor may execute any deterministic algorithm that is a function of the codes printed on the labels. For example, if the labels' codes are consecutive numbers, then the processor may execute an incrementing algorithm that takes a starting number, e.g., the first code, and generates consecutive numbers until a limit is reached, e.g., the total number of codes. Suppose the first code is the number 1000 and the total number of codes to generate is 15. Hence, the algorithm generates identification codes 1000, 1001, 1002, . . . , 1014.

It is to be understood that the code generating algorithm is not limited to one handling only numbers or one generating consecutive numbers.

After the identification codes are generated, the processor may store (440) the identification codes in data records in the inventory database for further use when the inventory operator is ready to enter item status information.

Optionally, the processor may check the generated identification codes to ensure that they are correct and/or in the appropriate order. If not, the processor may generate an error message or error report for the user. The processor may print out the generated identification codes or an error report.

Figure 5:
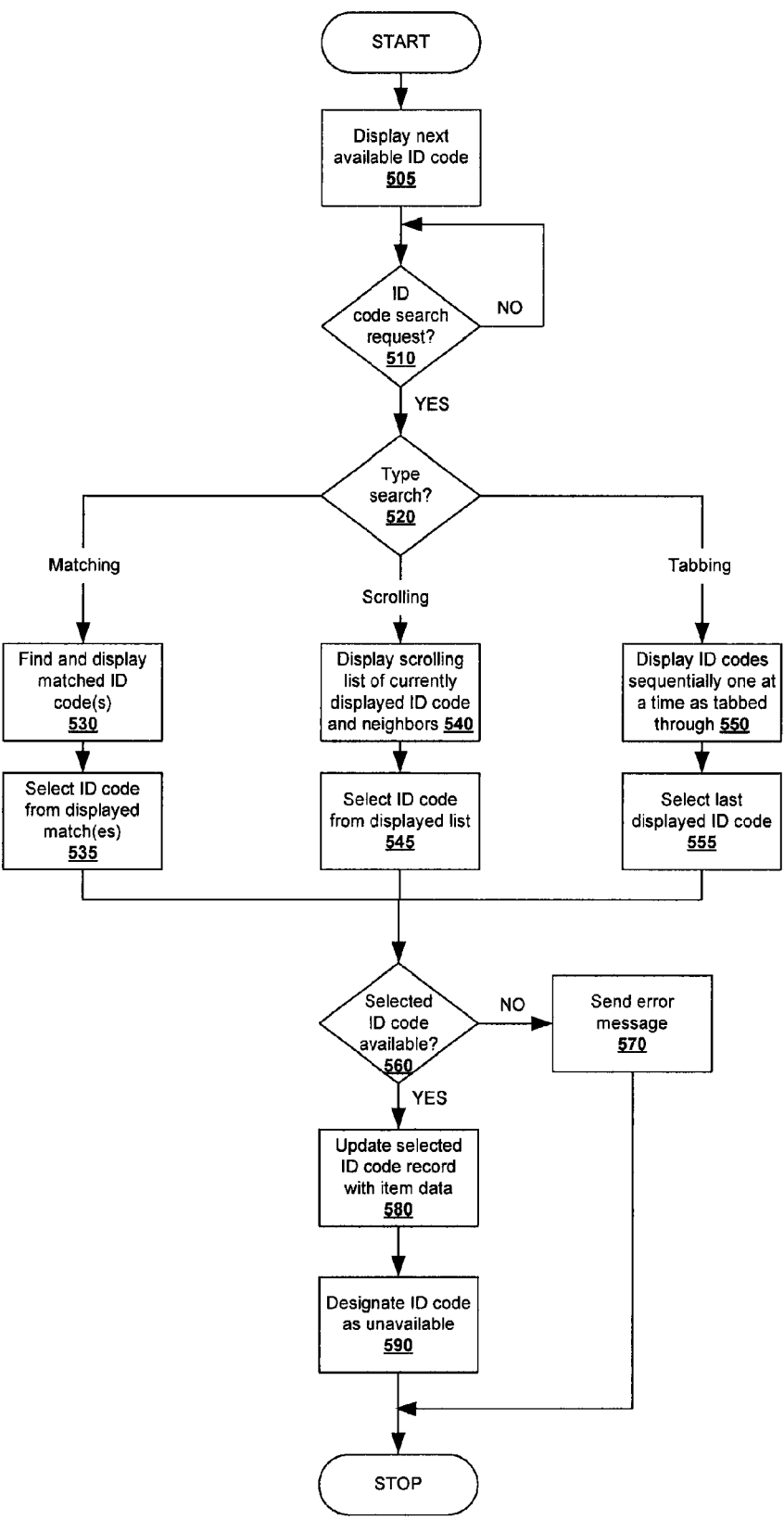
FIG. 5 is a flowchart of an identification code search method in accordance with an embodiment of the present invention.

FIG. 5 is a flowchart of a method to search for an identification code in a database according to an embodiment of the present invention. After items have been affixed with labels, a user may update the database to include information about the items and to indicate that the items have been received into inventory. To do so, the search application may search the database for the data record of the identification code corresponding to the label on each item and then enter inventory data received from the user into that data record.

In this method, the processor may display (505) the first identification code that is available. An identification code may be considered available if its data record does not include information about an item, which may mean that the item with the corresponding label has not yet been received into inventory or that the corresponding label is unused, lost, or expired, for example.

With the first available identification code displayed, the processor may await (510) a request from a user or another processor to search for an identification code corresponding to the label on an item. The received request may indicate the type of search to be performed, i.e., by matching an identification code, by scrolling through the identification codes, or by sequentially tabbing through the identification codes. The processor may determine (520) which type of search is requested.

If the processor receives, in the request, an input of at least a portion of the requested identification code, the processor may search by matching the identification code as follows. The processor may search (530) the identification codes in the database for those that match the inputted identification code or portion thereof. The processor may display (530) the matched identification code(s) to the user. If there is only one match, the processor may select (535) the matched identification code as the requested identification code. If the request includes only a portion of the requested identification code, the processor may likely find and display multiple matches. In which case, the user may pick the requested identification code from among the matches by clicking on it in the display. Accordingly, upon receipt of the user's pick, the processor may select (535) the identification code picked by the user as the requested identification code.

If the processor receives, in the request, an input indicating that the user has double-clicked on the currently displayed identification code, the processor may search by scrolling through the identification codes as follows. The processor may display (540) a scrolling list of the currently displayed identification code and a predetermined number of its neighboring identification codes. The neighboring identification codes may be those that are stored in data records adjacent to the data record of the currently displayed identification code. Or the neighboring identification codes may be those closest in value to the currently displayed identification code. The user may click on the scroll bar and scroll through the identification codes until the requested identification code is displayed. The user may pick the requested identification code by clicking on it in the display. Accordingly, upon receipt of the user's input from the scrolling bar, the processor may repeatedly display (540) identification codes. Upon receipt of the user's pick, the processor may select (545) the identification code picked by the user as the requested identification code.

In an alternate embodiment, rather than using a scrolling window, the processor may use a static window to display subsequent groups of identification codes. The user may then "scroll" through the identification codes by repeatedly double-clicking on the bottommost identification code in the static window to display that identification code's neighbors until the requested identification code appears somewhere in the window.

If the processor receives, in the request, an input indicating that the user has clicked on a tab button associated with the display window, the processor may search by tabbing through the identification codes as follows. Upon receipt of the user's repeated tab input, the processor may sequentially display (550) identification codes beginning with the currently displayed identification code until the requested identification code is displayed. The user may pick the requested identification code by clicking on it in the display. Accordingly, upon receipt of the user's pick, the processor may select (555) the identification code picked by the user as the requested identification code.

In one embodiment, some or all of the identification codes may be generated according to the method of FIG. 4, for example, prior to the search. In an alternate embodiment, the identification codes may be generated during the search. For example, if the user enters a portion of a requested identification code when searching by matching, the processor may generate one or more of the next available identification codes that have the portion, e.g., as the least significant digits. If the user searches by scrolling, the processor may generate a predetermined number of the currently displayed identification code's neighbors. If generated neighbors are not selected, the processor may store them in data records for later use. If the user searches by sequentially tabbing, the processor may generate each successive identification code as the user tabs. If generated identification codes are not selected, the processor may store them in data records for later use.

After the requested identification code is found, the processor may determine (560) whether the requested identification code is available by checking its data record for item status information, for example. Any other acceptable way may be used to indicate whether the requested identification code is available.

If the requested identification code is available, the processor may update (580) the requested identification code's data record by retrieving the data record from the database, adding the item's information to the data record, and storing the updated record. By updating the data record with item information, the processor may indicate (590) the requested identification code is now unavailable. Any other acceptable way may be used to show that the requested identification code is unavailable.

If the requested identification code is not available, the processor may send (570) an error message or report to the user. The processor may also print out the message or report. An error may occur, e.g., if multiple items have the same label and one of the items has already been received into inventory and the data record updated. An error may also occur, e.g., if the user erroneously updated the requested identification code's data record rather than the correct data record.

After the data records have been updated for all the items, the processor may delete any unused identification codes from the database. If some labels are known to be lost or expired, the processor may also delete their corresponding identification codes from the database.

A graphical user interface may be used to search for an identification code. The interface may include at least one interactive search window and one or more interactive buttons in communication with the interactive search window(s). To search by matching, the user may enter all or part of the identification code into the window. This may trigger an application to conduct the database search for the entered identification code.

As discussed above, the window may initially show the next available identification code. To search by scrolling, the user may double-click, for example, on the code in the window, which may trigger the application to expand the window into a scrolling window or a pull-down window to show the displayed identification code and its neighbors. The user may click once, for example, on the identification code the user is looking for when it appears in the window, which may trigger the application to search the database for that identification code's data record. The interactive button may be the scrolling bar that appears with the scrolling window. The user may click on the scrolling bar to scroll through the identification codes as they are displayed in the expanded window. To search by tabbing, the interactive button may be the tab button. The user may click on the tab button to tab through the identification codes as they are displayed in the unexpanded window.

The graphical user interface may also include a delete button, which allows the user to scroll or tab through the identification codes and delete those that correspond to unused, lost, or expired labels.

Figure 6:
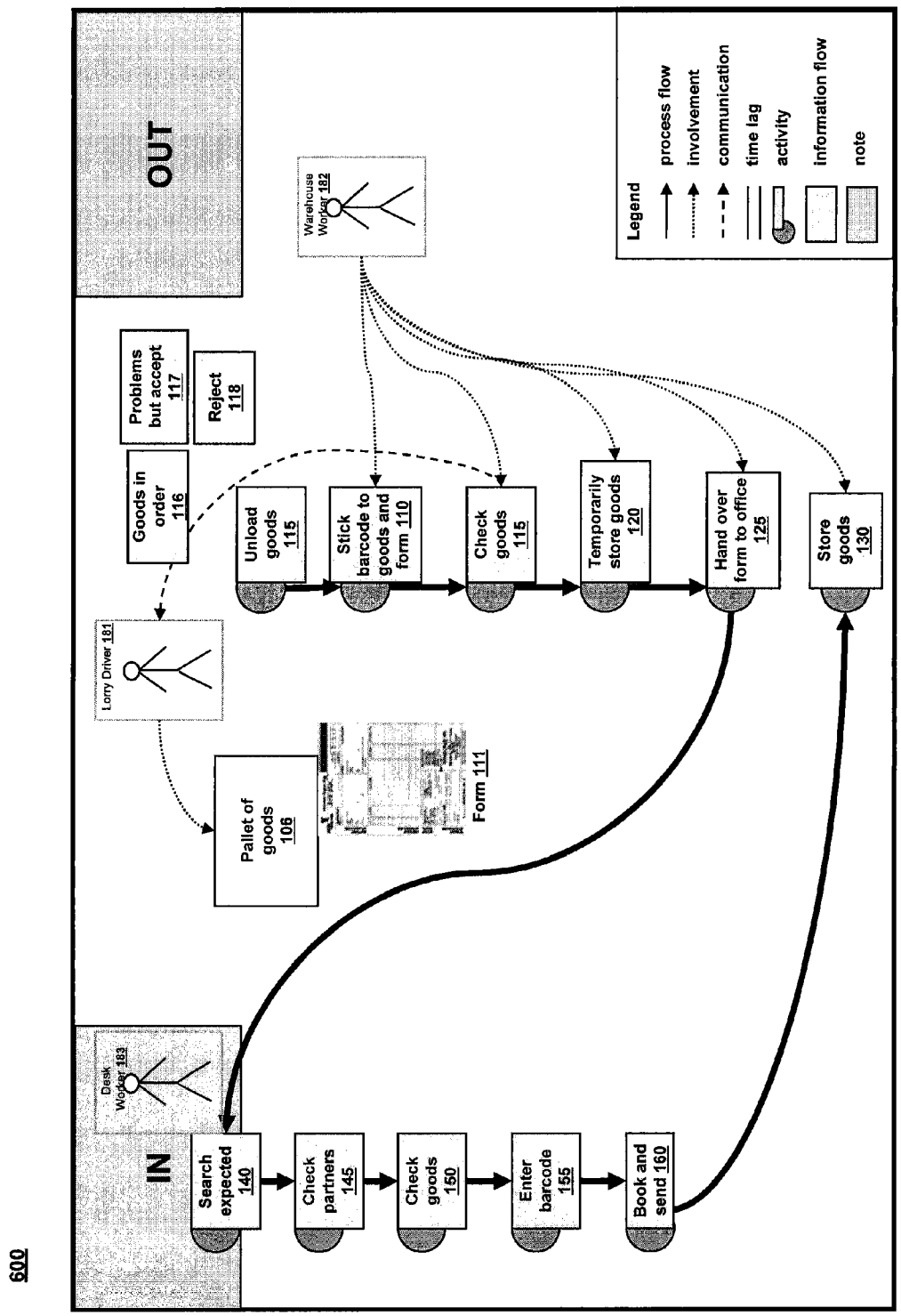
FIG. 6 is a block diagram that illustrates a use scenario in which embodiments of the present invention may be applied.

FIG. 6 illustrates a use scenario in which embodiments of the present invention may be applied. As illustrated, a lorry driver 181 may deliver and unload (105) a pallet of goods 106 to a warehouse. Each good (or item) may have a shipping form 111 attached thereto. A warehouse worker 182 may have a roll of sequential pre-printed inventory tracking label pairs to affix to the goods and their shipping forms. Both labels in a label pair may have the same identification code, e.g., the same barcode, printed thereon. The worker 182 may affix (110) one label from a label pair to a good and the other label from the label pair to that good's shipping form in order to tie the good and its shipping form together. The worker 182 may then check (115) the goods to insure that they are what was ordered and in the amounts ordered, that they are in acceptable condition, etc. The worker 182 may communicate to the lorry worker 181 whether the goods are accepted (116), have problems but will be accepted (117), or are rejected (118). The lorry driver 181 may then return any rejected goods to the shipper. The warehouse worker 182 may store (120) the accepted goods in a temporary location in the warehouse until they are logged into the inventory database. The worker 182 may hand over (125) the barcode-labeled shipping forms for the accepted goods to a desk worker 183 to log into the database.

Upon receipt of the barcode-labeled shipping forms, the desk worker 183 may search (140) through the records of pending orders to determine whether the received goods indicated on the shipping form were expected. The desk worker 183 may further check (145) with the shippers and any other business partners to verify the orders. The desk worker 183 may check (150) the record of pending orders against the goods indicated on the shipping form to determine whether the goods are what was ordered. If the checks verify the shipment, the desk worker 183 may then enter (155) the barcode from the shipping form and status information about the good affixed with the barcode, in accordance with an embodiment of the present invention. After the desk worker 183 has entered all the goods' status information in association with the barcodes, the desk worker 183 may send (160) an acknowledgement to the warehouse that the goods have been logged into the inventory database.

Upon receipt of the acknowledgement, the warehouse worker 182 may store (130) the accepted goods in a more permanent location in the warehouse for later processing.

It is to be understood that the above scenario is only one of many in which embodiments of the present invention may be applied to a warehouse inventory system. It is further to be understood that embodiments of the present invention may be applied in other systems and uses.

Figure 7:
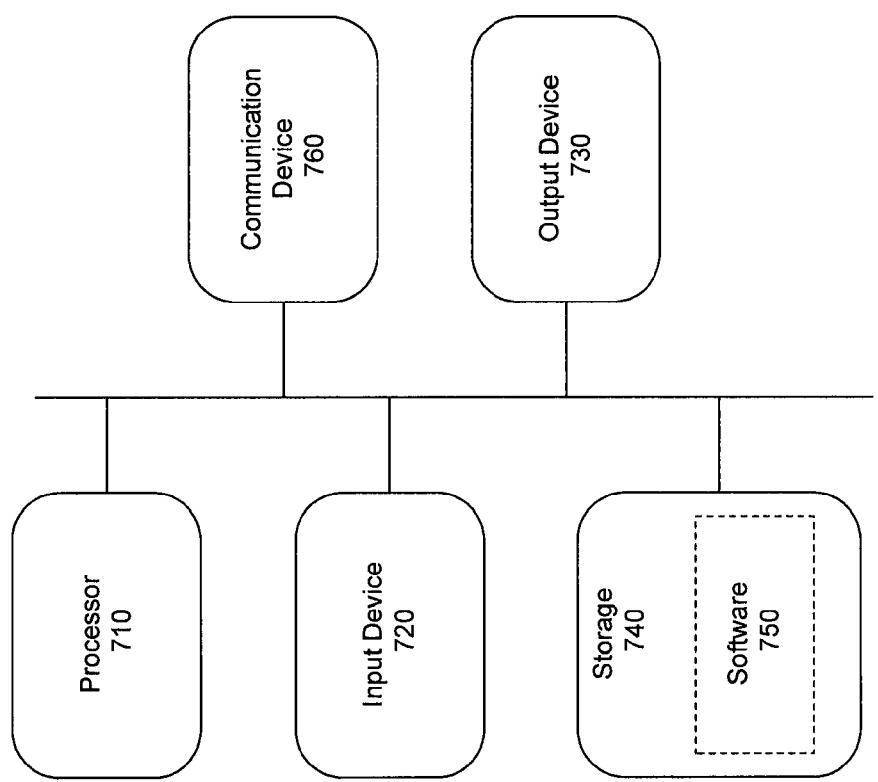
FIG. 7 is a block diagram that depicts a computing device for implementing a method in accordance with an embodiment of the present invention.

FIG. 7 illustrates the components of a basic computing device in accordance with an embodiment of the present invention. The computing device may be a personal computer, workstation, handheld personal digital assistant ('PDA'), or any other type of microprocessor-based device. The computing device may include one or more of processor 710, input device 720, output device 730, storage 740, and communication device 760.

Input device 720 may include a keyboard, mouse, pen-operated touch screen or monitor, voice-recognition device, or any other device that provides input. Output device 730 may include a monitor, printer, disk drive, speakers, or any other device that provides output.

Storage 740 may include volatile and nonvolatile data storage, including one or more electrical, magnetic or optical memories such as a RAM, cache, hard drive, CD-ROM drive, tape drive or removable storage disk. Communication device 760 may include a modem, network interface card, or any other device capable of transmitting and receiving signals over a network. The components of the computing device may be connected via an electrical bus or wirelessly.

Software 750, which may be stored in storage 640 and executed by processor 610, may include, for example, the application programming that embodies the functionality of the present invention.

The network connecting the computer components may include any type of interconnected communication system, which may implement any communications protocol, which may be secured by any security protocol. The corresponding network links may include telephone lines, DSL, cable networks, T1 or T3 lines, wireless network connections, or any other arrangement that implements the transmission and reception of network signals.

The computing device may implement any operating system, such as Windows or UNIX. Software 750 may be written in any programming language, such as ABAP, C, C++, Java or Visual Basic. In various embodiments, application software embodying the functionality of the present invention may be deployed on a standalone machine, in a client/server arrangement or through a Web browser as a Web-based application or Web service, for example.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer-implemented data entry method for an inventory computer system, comprising:
    querying, by the inventory computer system, an operator for identification of a first inventory tracking code from a collection of pre-printed inventory tracking labels which have not yet been associated with inventory, the inventory tracking labels to be physically affixed to inventory items;
    querying, by the inventory computer system, the operator for status information about a first inventory item;
    storing the status information about the first inventory item in association with the first inventory tracking code in a memory of the inventory computer system; and
    repeatedly,
    proposing, by the inventory computer system, to the operator a subsequent inventory tracking code derived from the first inventory tracking code and previously used tracking codes,
    querying, by the inventory computer system, the operator for status information about a subsequent inventory item, and
    storing the status information about the subsequent inventory item in association with the subsequent inventory tracking code in the memory of the inventory computer system,
    wherein after the operator enters a portion of the first inventory tracking code, the computer inventory tracking system generates a list of unused tracking codes containing the portion entered by the operator.

2. The computer-implemented method of claim 1, wherein the proposing comprises:
    incrementing the immediately preceding proposed inventory tracking code to get the proposed subsequent inventory tracking code.

3. The computer-implemented method of claim 1, wherein the proposing comprises:
    executing a deterministic algorithm based on to the inventory tracking codes to get the proposed subsequent inventory tracking code.

4. The computer-implemented method of claim 1, further comprising:
    when there is a discontinuity in the inventory tracking codes, querying the operator for identification of the first inventory tracking code after the discontinuity.

5. The computer-implemented method of claim 1, wherein duplicates of the inventory tracking labels are to be physically affixed to respective shipping forms for the inventory items.

6. An inventory data entry system comprising:
    a memory; and
    a processor in communication with the memory to
    query an operator for a code pre-printed on a first of a set of pre-printed labels which has not been associated with inventory, the labels to be attached to inventory items,
    generate the plurality of identification codes based on the code pre-printed on the first label and previously used codes, the identification codes and corresponding codes pre-printed on the labels being the same, and
    store, in the memory, status information about the items in association with the identification codes that correspond to the labels affixed to the respective items,
    wherein after the operator enters a portion of the code pre-printed on the first set of pre-printed labels, the processor generates a list of unused tracking codes containing the portion entered by the operator.

7. The system of claim 6, wherein the processor is to:
    propose to the operator each generated identification code, and
    if the proposed identification code is acceptable, store the status information about the item in association with the proposed identification code,
    otherwise, receive a request for another identification code from the operator and store the status information about the item in association with the requested identification code.

8. The system of claim 6, wherein the processor is to:
    when a label is attached to an item,
    find a data record that includes the identification code that corresponds to the attached label, and
    update the data record to include status information about the item.

9. The system of claim 6, wherein the processor is to:
    upon receipt of a request from the operator to search for an identification code, search the identification codes for the requested identification code, and
    retrieve a data record that includes the identification code.

10. The system of claim 6, wherein the processor is to:
    delete the identification codes that correspond to lost or expired pre-printed labels.

* * * * *